(12) United States Patent
Besier et al.

(10) Patent No.: US 11,661,048 B2
(45) Date of Patent: May 30, 2023

(54) BRAKE SYSTEM AND BRAKE CONTROL DEVICE

(71) Applicant: Continental Teves AG & Co. oHG, Frankfurt (DE)

(72) Inventors: Marco Besier, Bad Schwalbach (DE); Stefan Drumm, Saulheim (DE); Paul Linhoff, Neu-Anspach (DE); Christian Courth, Frankfurt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 15/621,384

(22) Filed: Jun. 13, 2017

(65) Prior Publication Data

US 2017/0274884 A1 Sep. 28, 2017

Related U.S. Application Data

(63) Continuation of application No. PCT/EP2015/078963, filed on Dec. 8, 2015.

(30) Foreign Application Priority Data

Dec. 16, 2014 (DE) ...................... 10 2014 225 954.1

(51) Int. Cl.
  *B60T 13/68* (2006.01)
  *B60T 13/66* (2006.01)
  *B60T 13/14* (2006.01)

(52) U.S. Cl.
  CPC .......... *B60T 13/686* (2013.01); *B60T 13/142* (2013.01); *B60T 13/148* (2013.01); *B60T 13/662* (2013.01)

(58) Field of Classification Search
  CPC .... B60T 13/686; B60T 8/4872; B60T 8/4266; B60T 13/147; B60T 13/662; B60T 13/142; B60T 13/168; B60T 8/1766; B60T 8/268
  USPC ....................................... 303/114.1
  See application file for complete search history.

(56) References Cited

U.S. PATENT DOCUMENTS

| | | | | |
|---|---|---|---|---|
| 5,297,527 A | * | 3/1994 | Suzuki | B60K 15/03504 123/198 D |
| 5,984,429 A | * | 11/1999 | Nell | B60T 7/042 303/113.4 |
| 6,199,964 B1 | * | 3/2001 | Ota | B60T 8/1769 303/166 |

(Continued)

FOREIGN PATENT DOCUMENTS

| | | |
|---|---|---|
| CN | 103079914 A | 5/2013 |
| CN | 103492247 A | 1/2014 |

(Continued)

OTHER PUBLICATIONS

English translation of DE 102012205861 A1 (Year: 2012).*

(Continued)

*Primary Examiner* — Nicholas J Lane
*Assistant Examiner* — Mahbubur Rashid (57) ABSTRACT

A second electrohydraulic brake control device for a motor vehicle comprises a pressure control valve assembly, an controllable pressure source and a reservoir connection. For a group of wheel brakes, the second electrohydraulic brake control device is connected in series between the associated output pressure connections of a first or main brake control device and the vehicle wheel brakes.

16 Claims, 3 Drawing Sheets

(56) References Cited

U.S. PATENT DOCUMENTS

| | | | | |
|---|---|---|---|---|
| 6,227,626 | B1* | 5/2001 | Blattert | B60K 31/042 303/122.08 |
| 6,238,019 | B1* | 5/2001 | Okazaki | B60T 8/4872 303/146 |
| 6,705,683 | B2* | 3/2004 | Niepelt | B60T 13/686 303/11 |
| 7,469,974 | B2* | 12/2008 | Maki | B60T 8/3655 303/11 |
| 8,342,615 | B2* | 1/2013 | Drumm | B60T 8/4077 188/152 |
| 8,602,507 | B2* | 12/2013 | Vollert | B60T 1/10 303/114.1 |
| 8,898,024 | B2* | 11/2014 | Gilles | B60T 8/4059 702/50 |
| 8,950,826 | B2* | 2/2015 | Kunz | B60T 8/348 303/10 |
| 8,955,922 | B2 | 2/2015 | Kunz et al. | |
| 9,145,119 | B2* | 9/2015 | Biller | B60T 8/4081 |
| 9,365,199 | B2* | 6/2016 | Drumm | B60T 8/3655 |
| 2003/0020327 | A1 | 1/2003 | Isono et al. | |
| 2004/0011610 | A1* | 1/2004 | Witzler | B60T 8/345 188/265 |
| 2004/0075337 | A1* | 4/2004 | Giers | B60T 8/348 303/20 |
| 2005/0017574 | A1* | 1/2005 | Weiberle | B60T 8/1766 303/3 |
| 2012/0169112 | A1* | 7/2012 | Jungbecker | B60T 8/4081 303/9.75 |
| 2014/0015309 | A1* | 1/2014 | Mayer | B60T 8/489 303/3 |
| 2014/0110997 | A1* | 4/2014 | Biller | B60T 7/12 303/9.62 |
| 2014/0152085 | A1* | 6/2014 | Biller | B60T 8/4081 303/10 |
| 2014/0203626 | A1* | 7/2014 | Biller | B60T 8/17 303/10 |
| 2014/0225425 | A1* | 8/2014 | Drumm | B60T 7/042 303/9.75 |
| 2014/0306515 | A1 | 10/2014 | Claussen et al. | |
| 2015/0001854 | A1 | 1/2015 | Rivas | |
| 2015/0061854 | A1* | 3/2015 | Drumm | B60T 7/042 340/453 |
| 2016/0325719 | A1* | 11/2016 | Linhoff | B60T 8/92 |
| 2016/0339885 | A1* | 11/2016 | Linhoff | B60T 17/18 |

FOREIGN PATENT DOCUMENTS

| | | | | |
|---|---|---|---|---|
| DE | 10053993 | A1 | 6/2001 | |
| DE | 102006014836 | A1 | 10/2007 | |
| DE | 102012205861 | A1 * | 10/2012 | B60T 8/442 |
| DE | 102012205861 | A1 | 10/2012 | |
| DE | 102012205862 | A1 | 10/2012 | |
| DE | 102011122776 | A1 | 1/2013 | |
| DE | 102012210809 | A1 | 1/2013 | |
| DE | 102011116906 | A1 | 4/2013 | |
| DE | 102013007824 | A1 | 11/2013 | |
| DE | 102012215627 | A1 | 3/2014 | |
| DE | 102014225957 | A1 * | 6/2016 | B60T 13/141 |
| GB | 2148433 | A | 5/1985 | |
| JP | 2002264787 | A | 9/2002 | |
| KR | 100682522 | B1 | 2/2007 | |
| KR | 1020080030641 | A | 4/2008 | |
| KR | 1020110011939 | A | 2/2011 | |
| KR | 1020110114633 | A | 10/2011 | |
| KR | 1020120130234 | A | 11/2012 | |
| WO | 2012/028521 | A1 | 3/2012 | |
| WO | WO-2012049134 | A1 * | 4/2012 | B60T 7/042 |
| WO | WO-2012143313 | A1 * | 10/2012 | B60T 7/02 |
| WO | 2012/150120 | A1 | 11/2012 | |
| WO | WO-2013113625 | A1 * | 8/2013 | B60T 8/4081 |

OTHER PUBLICATIONS

English translation of WO2012143313A1 (Year: 2012).*
KR 20160108349 A (Year: 2016).*
International Search Report and Written Opinion dated Feb. 29, 2016 from corresponding International Patent Application No. PCT/EP2015/078963.
Search Report dated Jul. 22, 2015 from corresponding DE Patent Application No. 10 2014 225 954.1.
Korean Office Action dated Jun. 28, 2018 for corresponding Korean patent application No. 10-2017-7014569.
Japanese Office Action dated May 9, 2018 for corresponding Japanese patent application No. 2017-529827.
Office Action dated Dec. 5, 2018 from corresponding Chinese Patent Application No. 201580067585.1.
Decision of Grant dated Dec. 17, 2018 from corresponding Korean Patent Application No. 10-2017-7014569.

* cited by examiner

BRAKE SYSTEM AND BRAKE CONTROL DEVICE

This application claims the benefit of PCT International application No. PCT/EP2015/078963, filed Dec. 08, 2015, which claims the benefit of German patent application No. 10 2014 225 954.1, filed Dec. 16, 2014, each of which are hereby incorporated by reference herein.

The invention relates to a brake system in accordance with the preamble of claim 1 and to a brake control device in accordance with the preamble of claim 9.

Hydraulic brake systems are widely used in motor vehicles. To an increasing extent, use is being made of brake systems in which it is possible to perform braking operations that are triggered independently of a braking demand of the driver by assistance systems with the aid of electric or electronic means. Such braking operations triggered by electronic control units are employed in automatic headway control systems or (emergency) braking assistance functions, for example. Also known are "brake-by-wire" systems, which electronically detect brake actuation even in the case of a normal brake actuation by the driver and implement the corresponding braking in an electronically controlled manner without the driver having direct mechanical or hydraulic access to the wheel brakes during this process. In such systems, the availability of the brake system and, more specifically, of the wheel-specific brake pressure control functions is of great importance for safety.

It can be expected that use will also be made in future of motor vehicle brake systems that are suitable for motor vehicles traveling in an automated way. Fundamentally, these brake systems must be electronically controllable systems or "brake-by-wire" systems. This means that a brake demand can be made by means of electronic or electric control signals and implemented by the system without the intervention of the driver. Particularly in such systems, sufficiently high availability of the brake system and also of the power-operated braking function with wheel-specific control must be ensured for reasons of safety.

WO 2012/150120 A1 describes a brake system for motor vehicles which comprises four hydraulically actuable wheel brakes, a pressure-medium reservoir under atmospheric pressure, and a first electrohydraulic brake control device, which comprises a brake master cylinder, an electrically controllable pressure source, a pressure control valve assembly for setting wheel-specific brake pressures and a wheel-specific outlet pressure connection for each wheel brake. The brake system furthermore comprises a second electrohydraulic module having four electrically controllable pumps and electrically actuable valves, which is arranged hydraulically ahead of the pressure control valve assembly of the first brake control device. If the electronic open-loop and closed-loop control unit of the first brake control device fails, the brake pressures can only be set circuit-wise by means of the second module. Wheel-specific brake pressure setting of the kind required, for example, for antilock control is not possible with the second module. The availability of wheel-specific control functions is therefore only limited. This brake system is therefore less suitable for motor vehicles operating in a highly automated or autonomous fashion.

WO 2012/028521 A1 discloses a brake system for motor vehicles having an electrically controllable pressure supply device, a pressure control valve assembly for closed-loop and/or open-loop control of the wheel brake pressures input at the individual wheel brakes, and a first electronic open-loop and closed-loop control unit, which performs open-loop or closed-loop control of the pressure supply device and the pressure control valve assembly, wherein an electrically controllable additional pressure supply device having a second electronic open-loop and closed-loop control unit is provided, by means of which the brake master cylinder can be actuated. If the first electronic open-loop and closed-loop control unit fails, however, it is no longer possible to set wheel-specific brake pressures at the wheel brakes by means of the pressure control valve assembly. This brake system too is therefore less suitable for motor vehicles operating in a highly automated or autonomous fashion.

It is the object of the present invention to provide a brake system for at least four-wheeled motor vehicles and a brake control device which satisfy high requirements in respect of the availability of setting of wheel-specific brake pressures.

SUMMARY

According to the invention, this object is achieved by a brake system as claimed in claim 1 and a brake control device as claimed in claim 9.

It is the underlying concept of the invention, in a brake system for motor vehicles having hydraulically actuable wheel brakes, a pressure-medium reservoir under atmospheric pressure, and a first electrohydraulic brake control device, which comprises a first pressure control valve assembly for setting wheel-specific brake pressures, a first electrically controllable pressure source, and, for each hydraulically actuable wheel brake of the brake system, a wheel-specific outlet pressure connection, to provide a second electrohydraulic brake control device, which comprises a second pressure control valve assembly, a second electrically controllable pressure source, and a reservoir connection, and which is connected in series between the outlet pressure connections of the first brake control device, which are associated with one group of wheel brakes, and the wheel brakes of the group of wheel brakes, and is connected to the pressure-medium reservoir via the reservoir connection.

The invention offers the advantage that, even if one of the brake control devices fails, an electrically controlled pressure buildup and wheel-specific control at at least some of the wheel brakes continues to be possible with speed and precision by means of the other brake control device.

The wheel brakes which do not belong to the group of wheel brakes are preferably embodied so as to be both hydraulically actuable and also electromechanically actuable. As a particular preference, the second brake control device is embodied in such a way that it is designed to control the electromechanical actuation of said wheel brakes. If the first brake control device fails, it is thus nevertheless possible to build up a braking torque at all the wheel brakes by means of the second brake control device.

The second brake control device is preferably provided for actuation and control at least of the hydraulically actuable wheel brakes on a front axle of the motor vehicle. As a particular preference, the group of wheel brakes is formed by the hydraulically actuable wheel brakes on a front axle of the motor vehicle. As a particular preference, the wheel brakes on a rear axle of the motor vehicle are then embodied so as to be both hydraulically actuable and also electromechanically actuable.

As an alternative preference, the second brake control device is designed to actuate and control all the hydraulically actuable wheel brakes, i.e. the group of wheel brakes is formed by all the hydraulically actuable wheel brakes.

The second pressure source preferably comprises, for each wheel brake of the group of wheel brakes, a pump, wherein the suction sides of the pumps are connected to the pressure-medium reservoir.

The second pressure control valve assembly has, for each wheel brake of the group of wheel brakes, an electrically actuable outlet valve assembly having at least one valve that can be controlled in analog fashion or is embodied in analogized fashion, wherein the wheel brake can be connected to the pressure-medium reservoir by the outlet valve assembly. Thus, if the first brake control device fails, precise pressure setting at the individual corresponding wheel brakes can be carried out by controlled discharge of pressure medium into the pressure-medium reservoir by means of the second brake control device.

The second brake control device comprises, for each of the wheel brakes of the group of wheel brakes, a wheel-specific inlet pressure connection and a wheel-specific outlet pressure connection. In this case, the inlet pressure connection of the second brake control device is in each case connected to that outlet pressure connection of the first brake control device which is associated with the wheel brake, and the outlet pressure connection of the second brake control device is in each case connected to the wheel brake.

According to a preferred embodiment of the brake system according to the invention, the first brake control device is embodied as a structural unit in the form of a brake control unit having a first electronic open-loop and closed-loop control unit and a first hydraulic open-loop and closed-loop control unit, wherein the first electronic open-loop and closed-loop control unit is designed to control the first pressure control valve assembly and the first pressure source. Thus, the second brake control device can be added or not added, as required.

The second brake control device is preferably a brake control device according to the invention.

The invention also relates to a brake control device for actuating hydraulically actuable wheel brakes, which comprises an electrically controllable pressure source, a wheel-specific outlet pressure connection for each of the wheel brakes and a pressure control valve assembly for setting wheel-specific brake pressures at the outlet pressure connections, a reservoir connection for connection to a pressure-medium reservoir under atmospheric pressure and a wheel-specific inlet pressure connection for each of the wheel brakes. This brake control device can thus be arranged in series between a brake control device known per se, which has an electrically controllable pressure source, a wheel-specific outlet pressure connection for each wheel brake and a pressure control valve assembly for setting wheel-specific brake pressures at the outlet pressure connections, and at least some of the wheel brakes.

The brake control device according to the invention offers the advantage that it can optionally be added in a motor vehicle or in a brake system known per se in order to allow highly automated driving or autonomous driving.

The reservoir connection is preferably connected to the pressure source for supplying the pressure source with pressure medium. This offers the advantage that the brake control device can draw in pressure medium largely without hindrance directly from the pressure-medium reservoir.

This is preferably an electrohydraulic brake control device for the two hydraulically actuable wheel brakes on the front axle of the motor vehicle or for the four hydraulically actuable wheel brakes on the front and rear axles of the motor vehicle.

The pressure source of the brake control device preferably comprises at least one pump for each of the wheel brakes provided for pressure control, wherein the suction sides of the pumps are connected to the pressure-medium reservoir via the reservoir connection. Corresponding pumps are basically already in widespread use in conventional brake systems based on the recirculation principle, can therefore be produced at low cost and, when connected directly to the pressure-medium reservoir, supply adequate pressure-medium volume flows since pressure medium can be drawn in quickly and to a sufficient extent from the pressure-medium reservoir.

The pressure control valve assembly of the (second) brake control device preferably comprises an electrically actuable outlet valve assembly for each outlet pressure connection, wherein the outlet pressure connection can be connected to the reservoir connection via the outlet valve assembly. As a particular preference, the outlet valve assembly comprises at least one valve that can be controlled in analog fashion or is embodied in analogized fashion. Thus, precise pressure setting is possible by controlled discharge of pressure medium into the pressure-medium reservoir.

The outlet valve assembly is preferably formed by series connection of an outlet valve that is closed when deenergized and a second valve that is open when deenergized and can be controlled in analog fashion or is embodied in analogized fashion.

As an alternative preference, the outlet valve assembly is formed by an outlet valve that is closed when deenergized and can be controlled in analog fashion or is embodied in analogized fashion.

The pressure control valve assembly preferably furthermore comprises an electrically actuable separating valve for each outlet pressure connection, said valve being open when deenergized, wherein the outlet pressure connection is connected to the associated inlet pressure connection via the separating valve. It is advantageous if the separating valve is embodied so as to be capable of analog control or so as to be analogized in order to allow precise control of the corresponding wheel brake pressure. In particular, the separating valve can be used to throttle outflow of pressure medium via the inlet pressure connection, this corresponding to hydraulic separation in the event of complete shutoff. As a particular preference, a check valve is connected in parallel with the separating valve, ensuring that activation of the separating valve does not act counter to this in the opposite direction of flow. The check valve has the effect that increasing the pressure available at the inlet pressure connection beyond the pressure instantaneously prevailing at the outlet pressure connection is passed to the outlet pressure connection, irrespective of the state of activation of the separating valve.

According to a preferred embodiment of the invention, the brake control device is embodied as a structural unit in the form of a brake control unit having an electronic open-loop and closed-loop control unit and a hydraulic open-loop and closed-loop control unit, wherein the electronic open-loop and closed loop control unit is designed to control the pressure control valve assembly and the pressure source. Thus, the (second) brake control device can simply be added as an option to a (first) brake control device of the main brake system (modular principle).

It is advantageous if the pressure source is embodied as a combination of an electric motor, preferably a single electric motor, with a number of pumps, wherein the number of pumps corresponds to the number of wheel brakes provided for pressure control.

The brake control device according to the invention is preferably added as a redundant system to supplement a power-operated brake system known per se (particularly preferably a "by-wire" brake system or a conventional brake system having a vacuum brake booster), wherein the (second) brake control device according to the invention is connected in series between the (first) brake control device of the brake system known per se and a group of wheel brakes (i.e. the wheel brakes or some of the wheel brakes). If the first brake control device fails, the (second) brake control device according to the invention preferably assumes the braking functions, in particular the pressure buildup function in the corresponding wheel brake circuits and wheel-specific brake control interventions. As a particular preference, the brake control device according to the invention carries out not only simple braking functions but also electronic braking force distribution (EBV) and/or an antilock control function (ABS) and/or traction control functions (ESP) and/or other brake activation processes.

If required, in particular if no hydraulic wheel brake pressure is introduced by the upstream first brake control device, the interposed second brake control device preferably sets or adjusts (wheel) brake pressures automatically.

The brake system is preferably designed in such a way that the second brake control device becomes active when the first brake control device fails. Failure means that the first brake control device does not build up a sufficient pressure or any pressure at all. In this case, the second brake control device performs the task of supplementing the wheel brake pressures to the required value or that of making them available.

The brake control devices are preferably designed in such a way that, in the normal mode (no failure of one of the brake control devices), one brake control device (advantageously the second brake control device) is in a passive mode (deenergized valves, no activation of the second pressure source) and the other brake control device (advantageously the first brake control device) performs the customary control functions.

The first brake control device is preferably embodied as a brake control unit having an electronic open-loop and closed-loop control unit and a hydraulic open-loop and closed-loop control unit.

To increase the availability of the brake system, the brake system preferably comprises at least two mutually independent electric power sources. As a particular preference, the first brake control device is supplied with electric power by a first electric power source, and the second brake control device is supplied with electric power by a second electric power source.

BRIEF DESCRIPTION OF THE FIGURES

Further preferred embodiments of the invention will become apparent from the dependent claims and from the following description with reference to figures which schematically show:

DETAILED DESCRIPTION

Figure 1:
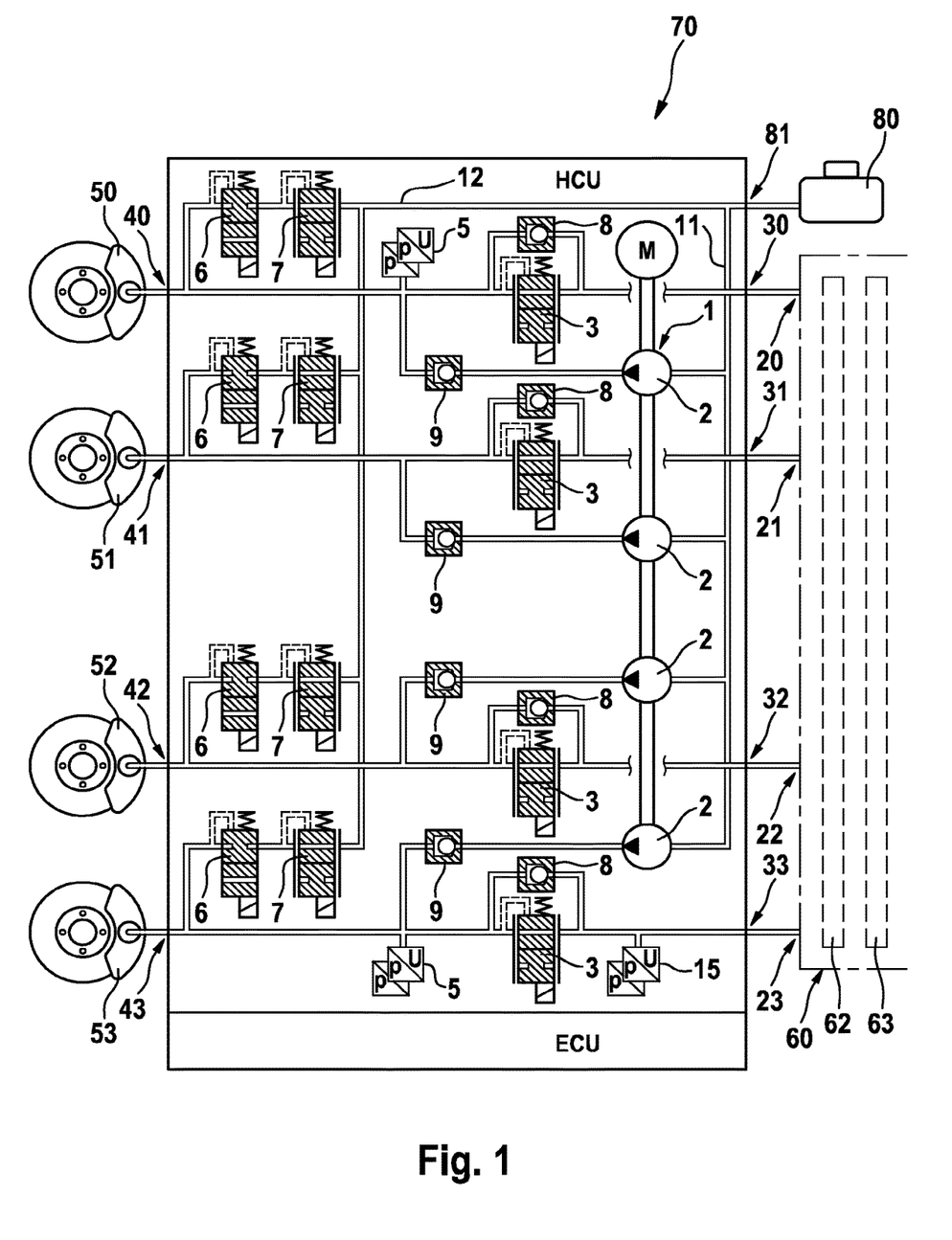
FIG. 1 a first illustrative embodiment of a brake control device according to the invention for a brake system according to the invention, FIG. 2 a second illustrative embodiment of a brake control device according to the invention for a brake system according to the invention.

A first illustrative embodiment of a brake control device 70 according to the invention is illustrated schematically in FIG. 1. According to the example, the brake control device 70 for four wheel brakes 50, 51, 52, 53 is illustrated, although a reduction to fewer wheel brakes and expansion to more wheel brakes are possible in a simple manner. According to the example, brake control device 70 is embodied as an independent structural unit or module, e.g. as a brake control unit having an electronic open-loop and closed-loop control unit (ECU) and a hydraulic open-loop and closed-loop control unit (HCU).

Connected to each of the wheel-specific inlet pressure connections 30, 31, 32, 33 of the brake control device 70 is a respective high-pressure-proof brake line, which in each case comes from one of the wheel-specific outlet pressure connections 20, 21, 22, 23 of a brake control device 60 (indicated purely schematically by dashed lines) of a main brake system. Connected to each of the wheel-specific outlet pressure connections 40, 41, 42, 43 of brake control device 70 is a respective high-pressure-proof brake line, which leads to one of the wheel brakes 50, 51, 52, 53. That is to say that brake control device 70 is arranged hydraulically in series between the brake control device 60 of the main brake system and the wheel brakes 50, 51, 52, 53.

The brake control device 70 furthermore comprises at least one reservoir connection 81 for connection to a pressure-medium reservoir 80 under atmospheric pressure.

In order to keep down the number of connections, the brake control device 70 advantageously comprises precisely one reservoir connection.

Brake control device 70 is thus arranged downstream of the brake control device 60 of the main brake system and offers the advantage that it can draw in pressure medium directly from the pressure-medium reservoir 80. Intake via brake control device 60 would lead to insufficient pressure-medium volume flows because of the flow resistances thereof.

Brake control device 70 comprises a pressure control valve assembly for setting wheel-specific brake pressures at the outlet pressure connections 40, 41, 42, 43, and an electrically controllable pressure source 1, and is thus suitable for the electrically controlled buildup of a system brake pressure and for wheel-specific brake pressure control.

For each outlet pressure connection 40, 41, 42, 43 or wheel brake 50, 51, 52, 53 (pressure control circuit), the pressure control valve assembly comprises an electrically actuable separating valve 3 and an electrically actuable outlet valve assembly, e.g. for brake pressure reduction during an antilock control operation (ABS).

In each pressure control circuit, the separating valve 3 is arranged in a hydraulic link between the inlet pressure connection 30, 31, 32, 33 and the associated outlet pressure connection 40, 41, 42, 43. It is advantageous if the separating valves 3 are embodied so as to be open when deenergized, so that, if brake control device 70 fails, the wheel-specific wheel brake pressures supplied by brake control device 60 are allowed through by brake control device 70 and are applied at the outlet pressure connections 40, 41, 42, 43. According to the example, the separating valves 3 are embodied in analogized fashion or in a manner which allows analog control.

According to the example, a check valve 8 opening in the direction of the wheel brake 50, 51, 52, 53 is arranged in parallel with each separating valve 3, ensuring that an inlet pressure at an inlet pressure connection 30, 31, 32, 33 which is greater than the associated wheel brake pressure is allowed through to the wheel brake, irrespective of the state of activation of the separating valve.

In each pressure control circuit, the outlet pressure connection 40, 41, 42, 43 and thus the wheel brake 50, 51, 52, 53 can be connected to the pressure-medium reservoir 80 by means of the outlet valve assembly. According to the example, the outlet valve assembly is formed by series connection of an outlet valve 6 that is closed when deenergized and a second valve 7, which is open when deenergized and can be controlled in analog fashion or is embodied in analogized fashion. According to the example, the outlet connections of the valves 7 are connected to the reservoir connection 81 by a common line segment 12.

According to the example, the electrically controllable pressure source 1 of brake control device 70 comprises a high-pressure pump 2 for each wheel brake 50, 51, 52, 53, said pumps being driven by a common electric motor M. The suction side of each pump 2 is connected to the pressure-medium reservoir 80 under atmospheric pressure. According to the example, the suction sides of the pumps 2 are connected to the reservoir connection 81 by a common intake line segment 11. The discharge side of each pump 2 is connected to the associated outlet pressure connection 40, 41, 42, 43 by means of a check valve 9 that opens in the direction of the associated wheel brake. In this case, the check valve can be formed by a discharge valve present in the pump, this generally being the case when a piston pump is used as the pump 2.

Each wheel brake 50, 51, 52, 53 to be supplied (in particular either the two wheel brakes on the front axle or the four front-axle and rear-axle wheel brakes according to the example) is thus assigned a "hydraulic module", which consists of a pump 2 and hydraulic valves 3, 6, 7 of the pressure control valve assembly and is of identical construction for each wheel brake to be supplied. According to the example, brake control device 70 comprises four identical pressure control circuits (one pressure control circuit for each wheel brake), each having essentially the electrically controllable pressure source in the form of the pump 2, the electrically actuable separating valve 3 and the outlet valve assembly 6, 7, wherein the intake sides of the pumps 2 and the valves 7 are connected to the reservoir connection 81.

According to the example, a respective pressure sensor 5 for determining the pressure at the outlet pressure connections 40 and 43 is provided in brake control device 70 for each of wheel brakes 50 and 53. In addition, according to the example, brake control device 70 comprises a pressure sensor 15 for determining the pressure at the inlet pressure connection 33. By means of the signal of this sensor, a pedal-controlled brake pressure buildup can be detected when the first brake control device 60 is electrically inactive.

Normally, pressure-medium reservoirs of conventional hydraulic brake systems comprise two chambers, which are associated with the two pressure spaces of the brake master cylinder that can be actuated by the brake pedal. It is advantageous if the pressure-medium reservoir 80 comprises three chambers, wherein the additional third chamber is provided for connection to brake control device 70. The pressure-medium volume drawn in during the operation of brake control device 70 is supplied from the third chamber, and the excess pressure-medium volume is discharged into the third chamber, e.g. during an antilock control operation by means of brake control device 70.

According to the invention, brake control device 70 is provided to supplement a brake control device 60 of a main brake system, said control device 60 itself comprising an electrically controllable pressure source 63 and a pressure control valve assembly 62 for setting wheel-specific brake pressures, i.e. being designed for the electrically controlled buildup of a system brake pressure and for wheel-specific brake pressure control.

For example, brake control device 60 is embodied as an independent structural unit or module, e.g. as a brake control unit (HECU) having an electronic open-loop and closed-loop control unit (ECU) and a hydraulic open-loop and closed-loop control unit (HCU). Here, the electronic open-loop and closed-loop control unit is designed to control the pressure control valve assembly 62 and the pressure source 63.

According to the example, brake pressure control device 60 (regular main brake module) performs system pressure buildup in the normal braking mode, and brake control device 70 (backup module) stands ready for the case where the system pressure supply function of brake control device 60 fails. In this situation, brake control device 70 takes over the pressure buildup by means of the pressure source 1. Brake control device 70 can build up a pressure independent of the driver and can modulate the pressure for each wheel by means of the pressure control valve assembly. In a fallback operating mode, e.g. when there is no electric power available for the brake system, i.e. brake control devices 60 and 70, and brake control device 70 allows a hydraulic pressure buildup input by the driver at any time.

According to the example, brake control devices 60 and 70 each comprise a separate electronic open-loop and closed-loop control unit (ECU) for controlling the respective pressure source and pressure control valve assembly. Brake control device 70 thus comprises the second electronic open-loop and closed-loop control unit required for redundancy of the brake system and comprises the second pressure source, and therefore there are two independent electronic open-loop and closed-loop control units and two independent electrically controllable pressure sources in the overall system.

Another advantage of the brake system according to the invention is that the brake pressures can be modulated in a wheel-specific manner with high availability, either by means of the pressure control valve assembly of brake control device 60 (main brake module) or by means of the pressure control valve assembly of brake control device 70 (backup module). Thus the lockup prevention function of the brake system can be maintained even when brake control device 60 is electrically inactive.

It is likewise advantageous that no further pressure line connections in addition to the already customary single pressure outlet connection for each wheel brake are required on brake control device 60. The brake control device 70 according to the invention can simply be connected to the wheel-specific pressure outlets of brake control device 60, of which there are usually four.

To further enhance availability, especially of the brake control function, it is advantageous if at least two independent electric power supplies are provided in the brake system. For example, brake control device 60 is supplied by a first electric power supply and brake control device 70 is supplied by a second electric power supply.

The brake system or main brake system preferably comprises further components known per se, e.g. a brake pedal or a brake master cylinder that can be actuated by the brake pedal. According to the example, brake control device 60 is connected to the pressure spaces of a brake master cylinder.

For example, brake control device 60 comprises a brake master cylinder that can be actuated by the brake pedal, a hydraulic brake-pedal feel simulator, a pressure source in the form of a hydraulic cylinder-piston assembly or of an electrohydraulic linear actuator, the piston of which can be actuated by an electric motor, e.g. via a rotation/translation mechanism, and a pressure control valve assembly.

As an alternative, the main brake system comprises a brake master cylinder that can be actuated by the brake pedal and can also be actuated by means of an electromechanical actuator (with an electric motor), for example.

As an alternative, the main brake system comprises a brake master cylinder with an upstream, electrically controllable vacuum brake booster, for example.

As an alternative or in addition, the main brake system or brake control device 60 comprises an ESP brake control unit known per se, which comprises a pressure control valve assembly having twelve valves for controlling the wheel brake pressures, a low-pressure reservoir for each brake circuit and a dual circuit recirculating pump.

Figure 2:
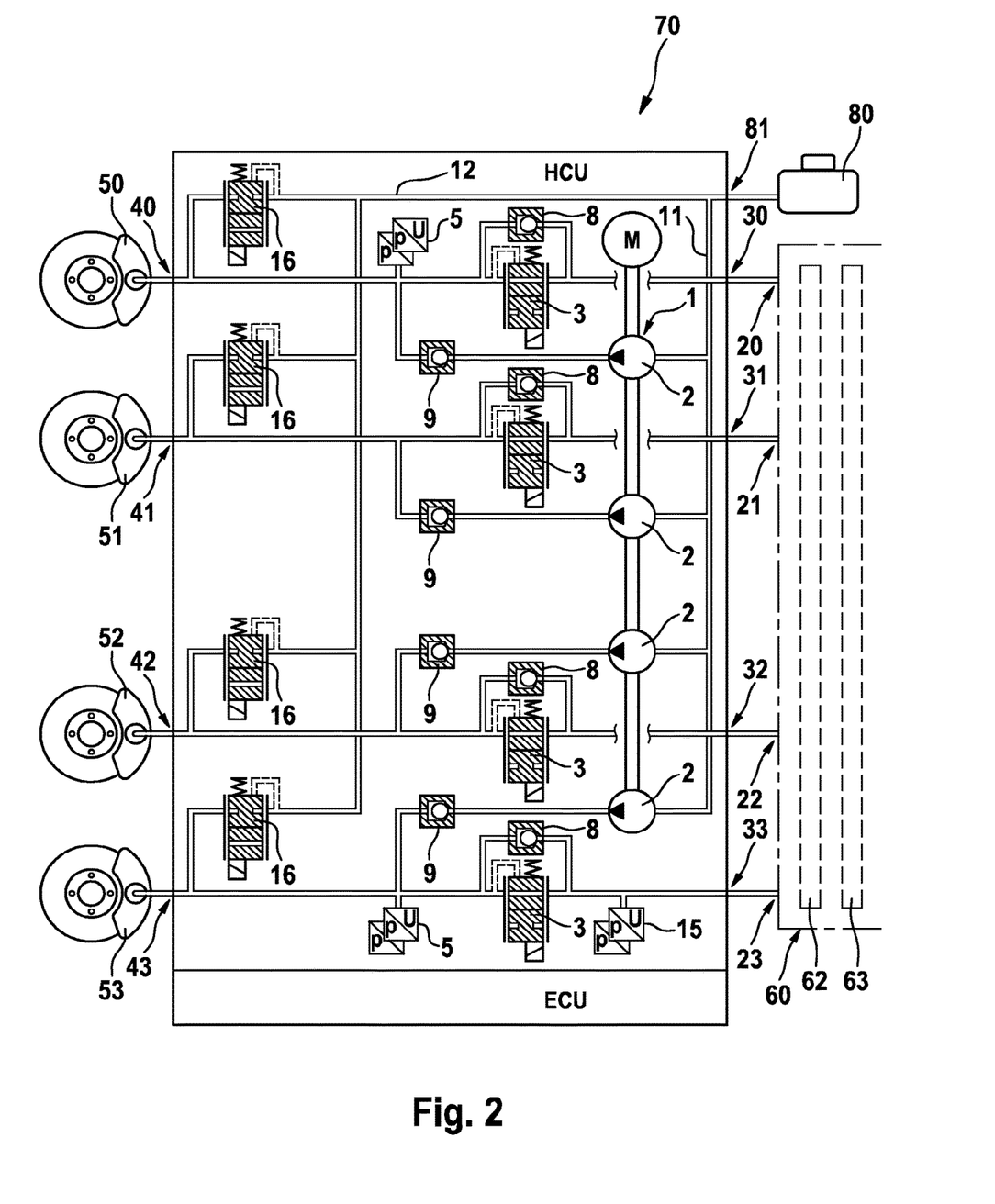

A second illustrative embodiment of a brake control device 70 according to the invention is illustrated schematically in FIG. 2. In contrast to the first illustrative embodiment in FIG. 1, the outlet valve assembly of the pressure control valve assembly is formed by one outlet valve 16 per pressure control circuit, which outlet valve is closed when deenergized and can be controlled in analog fashion or is embodied in analogized fashion. That is to say that the outlet valve 6 and the valve 7 of the first illustrative embodiment are replaced by outlet valve 16.

The brake system according to the invention satisfies the functional requirements on a brake system resulting from highly automated driving.

Figure 3:
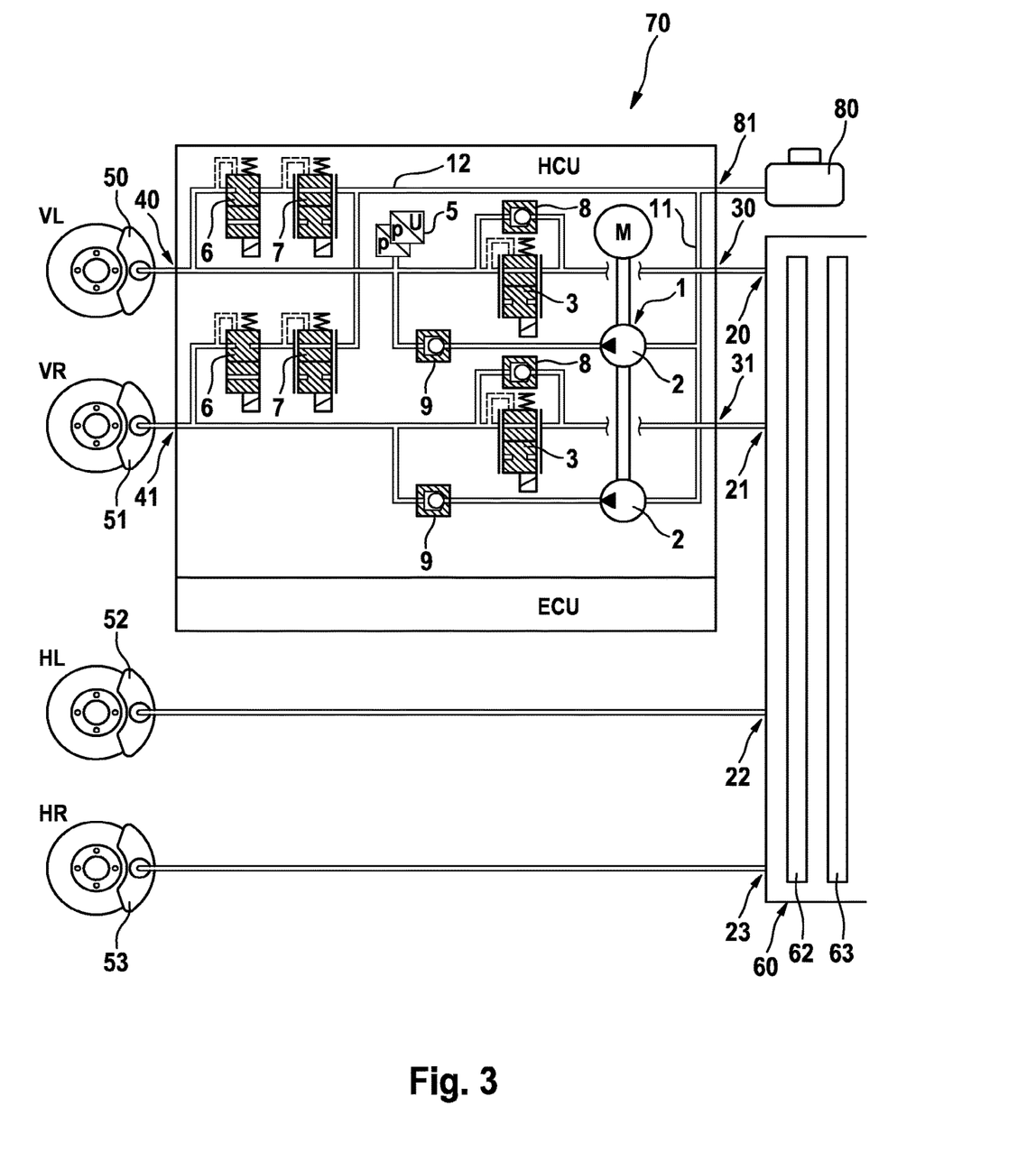
FIG. 3 shows another illustrative embodiment of a brake system according to the invention.

Another illustrative embodiment of a brake system according to the invention is illustrated schematically in FIG. 3. The brake system comprises four hydraulically actuable wheel brakes 50, 51, 52, 53 and a first brake control device 60 (referred to as the main brake system), which comprises a wheel-specific outlet pressure connection 20, 21, 22, 23 for each of these wheel brakes 50, 51, 52, 53. Brake control device 60 furthermore comprises an electrically controllable pressure source 63 and a pressure control valve assembly 62 for setting wheel-specific brake pressures at the outlet pressure connection 20, 21, 22, 23.

It is advantageous if brake control device 60 is embodied as an independent structural unit or module, e.g. as a brake control unit (HECU) having an electronic open-loop and closed-loop control unit (ECU) and a hydraulic open-loop and closed-loop control unit (HCU). Here, the electronic open-loop and closed-loop control unit is designed to control the pressure control valve assembly 62 and the pressure source 63.

The brake system furthermore comprises a second brake control device 70, which is provided for actuating and controlling just some of the hydraulically actuable wheel brakes. According to the example, brake control device 70 is provided for the two wheel brakes 50 and 51, which are associated with the front axle of the motor vehicle, for example (VR: front right-hand wheel, VL: front left-hand wheel). In corresponding fashion, brake control device 70 comprises a wheel-specific inlet pressure connection 30, 31 and a wheel-specific outlet pressure connection 40, 41 for each of the two wheel brakes 50 and 51, wherein the inlet pressure connection 30, 31 is connected by a high-pressure-proof brake line to the corresponding outlet pressure connection 20, 21 of the first brake control device 60, and the outlet pressure connection 40, 41 is connected by a respective high-pressure-proof brake line to wheel brake 50, 51.

The outlet pressure connection 22, 23 of the first brake control device 60 is connected by a high-pressure-proof brake line directly to wheel brake 52, 53, which is associated with the rear left-hand wheel HL or the rear right-hand wheel HR. As illustrated in FIG. 3, the brake lines can extend outside brake control device 70. As an alternative, the brake lines can also extend through brake control device 70.

The second brake control device 70 is thus connected hydraulically in series between the first brake control device 60 or the outlet pressure connections 20, 21, associated with the wheel brakes 50, 51, of the first brake control device 60 and the wheel brakes 50, 51.

The second brake control device 70 furthermore comprises at least one reservoir connection 81 for connection to a pressure-medium reservoir 80 under atmospheric pressure.

Otherwise, the fundamental construction of brake control device 70 corresponds to the construction of the illustrative embodiment of the (second) brake control device 70 explained in detail with reference to FIG. 1, in particular in respect of the pumps 2 and the pressure control valve assembly (valves 3, 6, 7, 8, 9). As an alternative, brake control device 70 can also be embodied in a manner corresponding to the illustrative embodiment shown in FIG. 2 (especially valves 3, 16, 8, 9).

A second brake control device 70 as illustrated, for example, in FIG. 3, having two hydraulic channels for the wheel brakes 50, 51 on the front axle is preferably combined with "EPB combination brakes" (EPB: electric parking brake) on the rear axle of the vehicle. Apart from its hydraulic function of a pressure-control clamping force buildup, the EPB combination brake can additionally be actuated electromechanically. That is to say, wheel brakes 52 and 53 are preferably embodied in such a way that they can be actuated both hydraulically and electromechanically.

According to the example, the second brake control device 70 is embodied as a brake control unit having an electronic open-loop and closed-loop control unit (ECU) and a hydraulic open-loop and closed-loop control unit (HCU). Here, the electronic open-loop and closed-loop control unit is designed to control the second pressure control valve assembly (3, 6, 7) and the second pressure source 1. It is furthermore advantageous if the EPB combination brakes are connected electrically to the electronic open-loop and closed-loop control unit of the second brake control device 70 to ensure that, in the event of a possible failure of the electronic open-loop and closed-loop control unit of the first brake control device 60, the electronic open-loop and closed-loop control unit of the second brake control device 70 is capable of building up braking torques at all four wheel brakes 50, 51, 52, 53.

What is claimed is:
1. A brake system for a motor vehicle, comprising:
at least four hydraulically actuatable wheel brakes, a pressure-medium reservoir under atmospheric pressure, and a first electrohydraulic brake control device comprising a first pressure control valve assembly configured to set at least four wheel-specific brake pressures, a first electrically controllable pressure source, and at least four wheel-specific outlet pressure connections, each wheel-specific outlet pressure connection connected to a distinct wheel brake of the four hydraulically actuatable wheel brakes, the first pressure control valve assembly configured to individually set the wheel specific brake pressure at each of the at least four wheel specific outlet pressure connections; and
a second electrohydraulic brake control device comprising:

a plurality of outlet pressure connections respectively coupled to a group of hydraulically actuatable wheel brakes among the at least four hydraulically actuatable wheel brakes;

a plurality of inlet pressure connections respectively coupled in series between wheel-specific outlet pressure connections of the at least four wheel-specific outlet pressure connections and the plurality of outlet pressure connections;

a plurality of actuatable separating valves respectively coupled between the plurality of inlet pressure connections and the plurality of outlet pressure connections, the plurality of actuatable separating valves configured to individually set the wheel specific brake pressure at each of the plurality of outlet pressure connections;

a second electrically controllable pressure source;

a reservoir connection connected to the pressure-medium reservoir; and a plurality of outlet valves respectively coupled between the plurality of outlet pressure connections and the reservoir connection.

2. The brake system of claim 1, wherein the group of the hydraulically actuatable wheel brakes is two of the hydraulically actuatable wheel brakes, and the two of the hydraulically actuatable wheel brakes are on a front axle of the motor vehicle.

3. The brake system of claim 1, wherein the second electrically controllable pressure source further comprises a plurality of pumps having a suction side respectively connected to the pressure-medium reservoir for each wheel brake of the group of hydraulically actuatable wheel brakes.

4. The brake system of claim 1, wherein the first electrohydraulic brake control device is embodied as a first electronic open-loop and closed-loop control unit and a first hydraulic open-loop and closed-loop control unit, and wherein the first electronic open-loop and closed-loop control unit is designed to control the first pressure control valve assembly and the first electrically controllable pressure source.

5. The brake system of claim 1, wherein brake pressure is individually modulated for each wheel brake of the at least four hydraulically actuatable wheel brakes by the first electrohydraulic brake control device and by the second electrohydraulic brake control device.

6. The brake system of claim 1, wherein each outlet valve among the plurality of outlet valves comprises:

a first valve that is closed when deenergized; and a second valve that is open when deenergized.

7. The brake system of claim 1, wherein each outlet valve among the plurality of outlet valves comprises an outlet valve that is closed when deenergized.

8. The brake system of claim 1, wherein each of the at least four wheel-specific outlet pressure connections of the first electrohydraulic brake control device is connected to only one inlet pressure connection of the second electrohydraulic brake control device such that there is a one-to-one correspondence between each of the at least four wheel-specific outlet pressure connections of the first electrohydraulic brake control device and a corresponding inlet pressure connection of the second electrohydraulic brake control device.

9. The brake system of claim 1, wherein each of the at least four wheel specific outlet pressure connection of the first hydraulic brake control device is connected to only one wheel brake of the four hydraulically actuatable wheel brakes and to only one inlet pressure connection of the second electrohydraulic brake control device.

10. The brake system of claim 1, wherein the second electrohydraulic brake control device and the plurality of actuatable separating valves are configured to individually set the wheel specific brake pressure at each of the plurality of outlet pressure connections without setting the wheel specific brake pressure of the outlet pressure connections in one or more groups of at least two.

11. A brake control device configured for at least four hydraulically actuatable wheel brakes of a motor vehicle brake system that comprises an electrically controllable pressure source, the brake control device comprising:

a plurality of outlet pressure connections respectively coupled to the at least four hydraulically actuatable wheel brakes;

a plurality of inlet pressure connections respectively coupled in series between at least four wheel-specific outlet pressure connections at which wheel specific brake pressure is set and the plurality of outlet pressure connections;

a plurality of actuatable separating valves respectively coupled between the plurality of inlet pressure connections and the plurality of outlet pressure connections, the plurality of actuatable separating valves configured to individually set the wheel specific brake pressure at each of the at least four wheel-specific outlet pressure connections;

a second electrically controllable pressure source;

a reservoir connection connected to the pressure-medium reservoir; and a plurality of outlet valves respectively coupled between the plurality of outlet pressure connections and the reservoir connection.

12. The brake control device of claim 11, wherein the reservoir connection is connected to the electrically controllable pressure source.

13. The brake control device of claim 11, wherein the second electrically controllable pressure source further comprises at least four pumps, a pump among the at least four pumps for each of the wheel brakes, and wherein the at least four pumps have a suction side respectively connected to the reservoir connection.

14. The brake control device of claim 11, wherein the brake control device is an electronic open-loop and closed-loop control unit and a hydraulic open-loop and closed-loop control unit configured to control the plurality of actuatable separating valves, the plurality of outlet valves, and the electrically controllable pressure source.

15. The brake control device of claim 11, wherein each inlet pressure connection of the plurality of inlet pressure connections is coupled to only one actuatable separating valve of the plurality of actuatable separating valves and to only one wheel-specific outlet pressure connection of the at least four wheel-specific outlet pressure connections.

16. The brake control device of claim 11, wherein the brake control device and plurality of actuatable separating valves are configured to individually set the wheel specific brake pressure at each of the at least four wheel-specific outlet pressure connections without setting the wheel specific brake pressure of the at least four wheel specific outlet pressure connections in one or more groups of at least two.

* * * * *